United States Patent [19]

Hoashi et al.

[11] 4,047,590

[45] Sept. 13, 1977

[54] HYDRAULIC CIRCUIT FOR STEERING CONTROL IN ARTICULATE VEHICLES

[75] Inventors: Kenzo Hoashi, Yokohama; Nobuaki Inaba, Hiratsuka, both of Japan

[73] Assignee: Kabushiki Kaisha Komatsu Seisakusho, Tokyo, Japan

[21] Appl. No.: 638,071

[22] Filed: Dec. 5, 1975

[51] Int. Cl.$^2$ .................................. B62D 5/06
[52] U.S. Cl. ..................... 180/139; 60/447; 60/449
[58] Field of Search ............ 180/139; 60/449, 450, 60/447, 445, 451, 488, 494

[56] References Cited
U.S. PATENT DOCUMENTS

| 3,543,508 | 12/1970 | Schwab | 60/449 |
| 3,785,754 | 1/1974 | Miller | 60/449 X |
| 3,905,194 | 9/1975 | Reimer | 60/449 |

FOREIGN PATENT DOCUMENTS 2,034,092  1/1972  Germany ........................ 180/139

Primary Examiner—Robert R. Song
Assistant Examiner—John A. Pekar
Attorney, Agent, or Firm—Armstrong, Nikaido & Marmelstein

[57] ABSTRACT

A hydraulic circuit for steering control in articulate vehicles which comprises an engine, a fixed displacement pump driven by the engine, a variable displacement pump driven by the engine, an exit port of the variable displacement pump being connected to a control valve of a steering actuator, an orifice provided at an outlet side of the fixed displacement pump and, a controlling cylinder connected to the variable displacement pump for controlling displacement of the variable displacement pump, the controlling cylinder being actuated by a spring disposed therein and a differential hydraulic pressure at the orifice.

3 Claims, 1 Drawing Figure

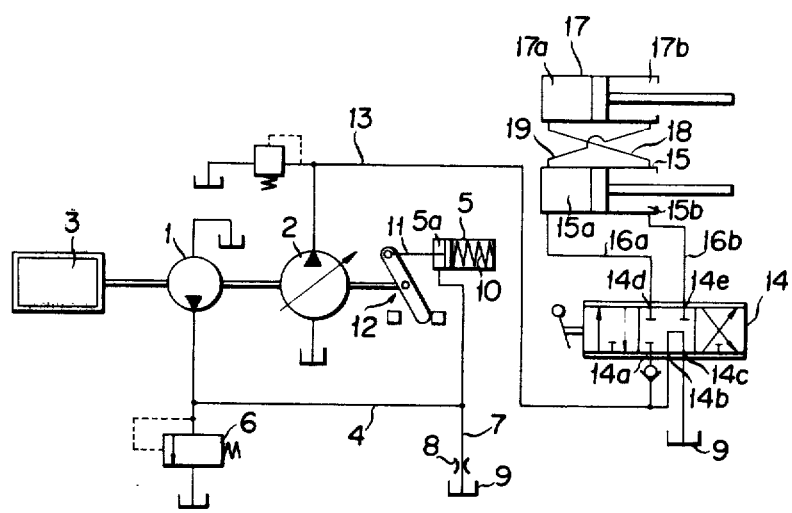

HYDRAULIC CIRCUIT FOR STEERING CONTROL IN ARTICULATE VEHICLES

This invention relates to a hydraulic circuit for steering control in articulate vehicles.

Heretofore a control has been carried out by using a combination of demand valves. An object of the present invention is to provide a hydraulic circuit in which a constant displacement from pumps is obtained ranging from idling state of an engine to full throttle thereof.

Another object of the present invention is to provide a hydraulic circuit in which filling for steering is maintained constant irrespective of the engine state.

Other objects, features and advantages of the present invention will be readily apparent from the following description taken in conjunction with the accompanying drawing in which;

The drawing shows a hydraulic circuit of the present invention.

Referring to the drawing, reference numeral 1 is a fixed displacement pump and reference numeral 2 a variable displacement pump, both pumps being driven by an engine or a prime mover 3. The fixed displacement pump 1 is communicated at an outlet port thereof through a pipe 4 with a rod portion 5a of a cylinder 5 for controlling a swash plate (or swash axle) of the variable displacement pump 2. On the pipe 4 are mounted a relief valve 6 and a branch pipe 7. The branch pipe 7 is provided with an orifice 8 and is communicated with a tank 9. The controlling cylinder 5 accomodates therein a spring 10 at a head thereof and is provided with a rod 11 which is connected with a means for actuating the swash plate. The variable displacement pump 2 is provided with an outlet port which is connected through a pipe 13 to ports 14a and 14b of a control valve 14. While, a port 14c of the control valve 14 is connected to the tank 9 and a port 14d is connected through a pipe 16a to a head portion of 15a of a steering actuator 15. Further, a port 14e of the control valve is connected through a pipe 16b to a rod portion 15b of the steering actuator 15. A head portion 15a of the steering actuator 15 is connected through a pipe 19 to a rod portion 17b of another steering actuator 17, while a head portion 17a of the steering actuator 17 is connected through a pipe 18 to the rod portion 15b of the steering actuator 15.

The volume of displacement of the fixed displacement pump 1 generally increases in proportion to a rotational frequency of the engine 3. Hence, the differential pressure in the orifice 8 is raised proportionally to the volume of displacement. When an angle of the swash plate of the variable displacement pump 2 is made maximum in an idling state, the volume of displacement from the fixed displacement pump 1 is reduced and the differential pressure in the orifice becomes small. Under such conditions, the rod 11 of the controlling cylinder 5 is moved toward a maximum displacement direction by the force of the spring 10 and, therefore, the angle of the swash plate is maintained maximum by means of the actuating means 12.

When the rotational frequency of the engine or prime mover is increased, the differential pressure appears in the orifice 8, by which the rod 11 of the controlling cylinder 5 is moved against the force of the spring 10. The movement of the rod 11 is transferred to the variable displacement pump 2 through the actuating means 12, decreasing the volume of displacement per unit revolution of the pump 2. However, the rotational frequency of the engine is so increased that the volume of displacement of the pump 2 (i.e., (volume of displacement per revolution) × (rotational frequency of engine)) remains constant in any state of from idling to full throttling. That is, with the idling state, though the volume of displacement per revolution of the variable displacement pump 2 is made maximum, the rotational frequency of the engine is small, whereas, with the full-throttling state, the rotational frequency of engine becomes high though the displacement volume per revolution of the pump 2 is minimized. Thus, the volume of displacement is held constant independently of the rotational frequency of engine.

As described in detail hereinbefore, the present invention contemplates to provide a hydraulic circuit for steering control in articulate vehicles, which comprises a fixed displacement pump 1 driven by a prime mover 3, a variable displacement pump 2 driven by the prime mover and provided with an exit port which is connected to a control valve 14 of a steering actuator, an orifice 8 provided at an exit side of the fixed displacement pump 1, and a controlling cylinder 5 which is actuated by both a differencial pressure induced in the orifice 8 and a spring 10 and which serves to control a swash plate of the variable displacement pump 2, whereby the volume of displacement is held constant in any state of idling to full throttling irrespective of a rotational frequency of the prime mover and the filling of the steering can be maintained constant.

What is claimed is:

1. A hydraulic circuit for steering control in articulate vehicles including a prime mover said circuit comprising:

a fixed displacement pump driven by said prime mover, the output of said fixed displacement pump being directly proportional to the speed of said prime mover;

a variable displacement pump driven by said prime mover, the output of said variable displacement pump being connected to a control valve of a steering actuator;

control cylinder means including a piston rod for controlling displacement of said variable displacement pump and a spring acting on said piston rod, said control cylinder means being connected to the fixed displacement pump through a first pipe;

restricting means having one side connected to the output of said fixed displacement pump through a branch pipe from said first pipe;

a reservoir coupled to the other side of said restricting means;

wherein said control cylinder means is actuated by the force of said spring and an opposite force resulting from a differential hydraulic pressure at said restricting means and whereby the output of said variable displacement pump is held constant irrespective of the speed of said prime mover; and linkage means interconnecting said variable displacement pump and the piston rod of said control cylinder means.

2. A hydraulic circuit for steering control in articulate vehicles of claim 1, wherein said restricting means is an oricice.

3. A hydraulic circuit for steering control in articulate vehicles of claim 1 wherein said variable displacement pump includes a swash plate and said piston rod of is coupled to the swash plate by said linkage means.

* * * * *